Aug. 5, 1958     F. F. STEINKAMP ET AL     2,846,234

KNEE ACTION SUSPENSION FOR MOTOR VEHICLE WHEELS

Filed Aug. 16, 1954

INVENTORS
FRANK F. STEINKAMP
W. HOWARD ULRICH

United States Patent Office 2,846,234
Patented Aug. 5, 1958

2,846,234

KNEE ACTION SUSPENSION FOR MOTOR VEHICLE WHEELS

Frank F. Steinkamp and Walter Howard Ulrich, Omaha, Nebr.

Application August 16, 1954, Serial No. 450,056

3 Claims. (Cl. 280—96.2)

This invention relates to independent front wheel suspension of motor vehicles and the like, and more particularly to the control arms usually pivoted to the vehicle frame at their inner ends and pivoted to the spindle supports at their outer ends.

The usual independent front wheel suspension of motor vehicles includes two control arms that are usually of V or wishbone shape when looked at from above or below; one of these arms is longer than the other and is pivotally connected to the under part of the vehicle frame at its two inner ends and likewise connected at its outer end to the lower part of the spindle support; the shorter upper control arm of the usual suspension is pivotally connected at its two inner ends to the upper part of the vehicle frame, and likewise connected at its outer end to the upper part of the spindle support.

It is characteristic of the independent wheel suspension of motor vehicles as heretofore constructed that the top of the wheels would tend to lean toward the outside of a curve when the vehicle was moving along a curve. This has had a tendency to make the vehicle tilt toward the outside of the curve, and cause travel of the vehicle around a curve to be uncertain and dangerous. Our invention is particularly concerned with improved shape and places of connection of the above-mentioned control arms.

An object of our invention is to provide a control arm of novel shape, which we call a cross control arm, the shape of which will permit it to be connected pivotally to the under part of the vehicle frame, and permit it to be pivotally connected to the upper part of the spindle support, and to provide a construction in which the other or lower control arm is attached at its outer end to the lower part of the spindle support and at its inner end to the lower part of the vehicle frame.

Our construction has a tendency to induce the tops of the vehicle wheels to lean toward the inside of the curve, at times when the vehicle is traveling around a curve.

Further advantages of our construction is that it tends to cause a motor vehicle to be more steady and have more resistance to leaving its course when traveling around a curve, and also enabling the vehicle to travel around a curve with greater speed and safety than was heretofore possible.

Other objects and advantages of this invention will be apparent from the following description, when taken in conjunction with the accompanying drawing, it being understood that changes in form, size, proportion of parts and minor details may be made said changes being within the scope of the invention as claimed:

Figure 1:
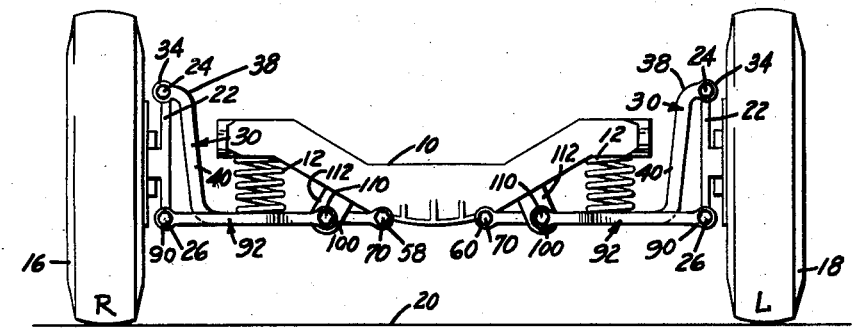
Figure 1 is a frontal elevation of a forward portion only of a vehicle frame showing the control arms of this invention connected thereto and holding the two forward wheels.

Referring to Figure 1 the forward portion of a frame of an automobile is shown at 10 and, as is usual, the frame 10 has means for receiving the upper ends of the two forward springs 12.

The right and left front wheels 16 and 18 are shown riding on the surface of a roadway 20.

The wheels 16 and 18 are mounted on spindle supports 22 which are substantially of conventional construction although, as explained hereinafter, the dimensions of the spindle supports 22 can be varied in accordance with this invention.

The spindle supports 22 are provided with pivot pins 24 extending through openings in the upper ends thereof and with like pivot pins 26 extending through openings in the lower ends thereof, the pins 24 and 26 extending forwardly and rearwardly and also horizontally as is usual in the art.

Figure 2:
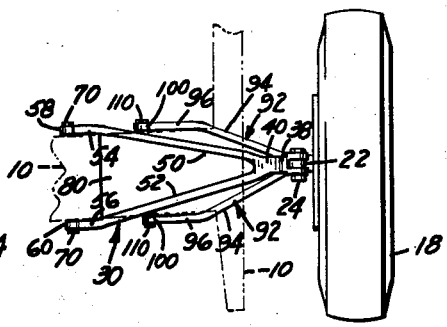
Figure 2 is a view of both control arms from above showing the parts and places of attachment of those parts and showing a wheel attached thereto and showing a portion of the frame in dotted lines.
Figure 3:
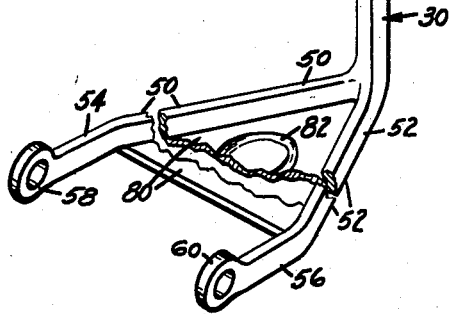
Figure 3 is a perspective view showing the cross control arm detached from the vehicle.

In accordance with this invention what we call a cross control arm 30 is provided as is best seen in Figure 3. Two of the cross control arms 30 are employed, one on the left and one on the right hand side of the vehicle, and as best seen in Figure 3 the outer and upper end of the cross control arm has two bearing eyes 34 which are spaced apart for receiving the corresponding spindle support 22 therebetween as best seen in Figure 2. The eyes 34 receive the upper pins 24 to form a pivotal connection.

The cross control arms have an inwardly and downwardly curving first portion 38 which is connected at its lower end to a substantially upright downwardly and slightly inwardly extending straight portion 40.

The straight portion 40 extends downwardly to a position preferably horizontally outwardly from the lower side of the frame 10. At this point the lower end of the straight portion 40 joins two diverging portions 50 and 52 which latter extend inwardly in approximately a V-shape with respect to each other. The portions 50 and 52 preferably extend inwardly to a point approximately at the inner side of the respective spring 12. At this point the inner ends of the members 50 and 52 respectively join substantially transverse portions 54 and 56, which latter extend approximately transversely of the vehicle and inwardly joining two bearing eyes respectively 58 and 60.

The bearing eyes 58 and 60 are connected to the frame by suitable means such as forwardly and rearwardly extending bolts 70 which latter are disposed through means for connecting the bolts 70 to the frame 10, thereby making a pivotal connection between the inner ends of bearing eyes 58 and 60 of the cross control arm 30 and the frame 10, whereby the cross control arm 30 is adapted to pivot about a substantially horizontal and forwardly and rearwardly longitudinally extending axis, extending through the centers of the bearing eyes 58 and 60, which latter are aligned with each other.

The cross control arm 30 is further provided with a plate 80 extending transversely across the portions 50 and 52 and being attached rigidly thereto. The plate 80 is provided with a retaining ring 82 which is recessed therein for receiving the lower end of the respective spring 12. The lower end of the spindle support members 22 are connected by the longitudinally extending substantially horizontal pins 26 to bearing eyes 90 on the outer ends of a second control member which shall be called the lower control member or arm 92. The lower control member or arm 92 is normally substantially horizontally disposed with respect to the normal disposition of the frame 10.

The general shape of the lower control arm 92 is a V shape and at its outer end the bearing eyes 90 are connected to preferably inclinedly disposed portions 94 which latter incline outwardly away from each other and connect to transversely extending substantially horizontal portions 96. The portions 96 are spaced apart a considerable distance similarly to the inner end of the cross control arm 30.

The transverse portions 96 are each respectively connected to bearing eyes 100 which latter receive a bolt 110. The bolt 110 is secured to the underside of the frame 10 by downwardly extending ears 112.

As thus described the lower arm 92 is able to pivot about a longitudinal and substantially horizontal axis extending through its aligned inner bearing eyes 100 and upon suitable bolts 110 pivotally connecting the bearing eyes 100 to the frame 10.

In operation it will be seen that as the vehicle rounds a curve the control arms of this invention will function in a different manner than the control arms of prior art suspensions.

For example, assuming that the vehicle of Figure 1 is rounding a curve such that the right wheel 16 is on the outside of the curve, then the body of the vehicle will tend to tilt by centrifugal force outwardly at its upper end with the effect that the body of the vehicle will exert a force downwardly on the right hand side of the frame 10, pushing downwardly upon the right spring 12. This in turn forces downwardly on the lower portion of the cross arm 30, causing the upper end of the cross arm to move inwardly, inasmuch as the outer end of the lower arm 92 will stay in approximately the same vertical position and the spindle support 22 will tend to pivot inwardly at its upper end, pivoting about its lower end.

This action causes the right wheel 16 to move inwardly at its upper end along with the spindle support 22. This is the effect we desire for the reason that this causes the wheel 16 to be in a better position to resist the force of the pavement 20 upon the wheel 16 resultant from the general centrifugal force of the vehicle rounding the curve.

In analogy this is much the same as a baseball player leaning inwardly as he rounds the bases of a baseball diamond.

The left hand wheel, during this same period, will be affected by a corresponding raising upwardly of the left hand side of the frame 10, thus pushing the upper end of the cross arm 30 outwardly to the end that the left wheel spindle support 22 tilts outwardly at its upper end in pivoting about its lower end. The left wheel 18 pivots with its spindle support arm 22, thus pivoting outwardly at its upper end and assuming an inclined position with respect to the vertical as is the desired object of the suspension system of this vehicle.

As thus described it will be seen that the two wheels act in unison for attaining the desired effect.

From the foregoing description, it is thought to be obvious that a knee action suspension for motor vehicle wheels constructed in accordance with our invention is particularly well adapted for use, by reason of the convenience and facility with which it may be assembled and operated, and it will also be obvious that our invention is susceptible of some change and modification without departing from the principles and spirit thereof, and for this reason we do not wish to be understood as limiting ourselves to the precise arrangement and formation of the several parts herein shown in carrying out our invention in practice, except as claimed.

We claim:
1. For use with a vehicle having a frame with a lower portion, a steerable wheel disposed alongside said frame and a spindle secured in said wheel, a spindle support having upper and lower portions attached to the frame side of said spindle, a suspension control arm combination as follows: a bifurcated lower arm having inner and outer ends, pivotal joint means connecting the inner ends of said lower arm to said lower portion of the frame, pivotal joint means connecting the outer ends of the lower arm to the lower portion of the spindle support, and a cross arm having an inner portion disposed in approximately the same plane as the lower arm and disposed clearingly between the bifurcations of the lower arm, said inner portion of the cross arm adapted for vertical movement between the bifurcations of the lower arm, said cross arm having an inner end connected by pivotal joint means with the lower portion of the frame, and the cross arm having an outer end connected by pivotal joint means with the upper portion of the spindle support at a point spaced a substantial distance above the connection of the outer end of the lower arm with the spindle support.

2. The combination described in claim 1 in which the inner end of said lower arm and the inner end of said cross arm are disposed in approximately the same horizontal plane.

3. For use with a vehicle having a frame, a steerable wheel with upper and lower portions disposed alongside said frame and a spindle secured in said wheel, a spindle support having upper and lower portions attached to the frame side of said spindle, a suspension control arm combination as follows: a lower control arm having inner and outer ends, pivotal joint means connecting the inner end of the lower arm to said frame, pivotal joint means connecting the outer end of the lower arm to said lower portion of the spindle support, the inner and outer ends of the lower arm being disposed in approximately the same horizontal plane for decreasing any inwardly or outwardly movement of said lower portion of the wheel relative to the frame, and a cross arm having an inner end connected by pivotal joint means to the frame, said cross arm extending from its inner end a substantial distance outwardly toward the spindle support, the cross arm having an outer end connected by pivotal joint means to said upper portion of the spindle support, the outer end of the cross arm being disposed in a substantially higher horizontal plane than its inner end for increasing any inwardly or outwardly movement of said upper portion of the wheel relative to the frame simultaneously with said decreasing any inwardly or outwardly movement of the lower portion of the wheel, the inner end of the lower arm and the inner end of the cross arm being disposed in approximately the same horizontal plane, and spring means disposed between one of said arms and a portion of said frame for supporting the frame.

References Cited in the file of this patent

UNITED STATES PATENTS

| | | |
|---|---|---|
| 2,123,087 | Leighton | June 5, 1938 |
| 2,153,083 | Griswold | Apr. 4, 1939 |
| 2,299,087 | Goetz | Oct. 20, 1942 |
| 2,321,832 | Leighton | June 15, 1943 |
| 2,455,343 | Slack et al. | Nov. 30, 1948 |
| 2,761,696 | Brown | Sept. 4, 1956 |